United States Patent [19]

Simpson

[11] 4,108,232
[45] Aug. 22, 1978

[54] SHIELD FOR SEALING A TUBELESS TIRE ON A SPOKED WHEEL RIM

[75] Inventor: Robert O. Simpson, Cuyahoga Falls, Ohio

[73] Assignee: The Goodyear Tire & Rubber Company, Akron, Ohio

[21] Appl. No.: 736,686

[22] Filed: Oct. 28, 1976

[51] Int. Cl.² .............................................. B60C 5/08
[52] U.S. Cl. .................................... 152/365; 152/366
[58] Field of Search .............. 152/363, 364, 365, 366, 152/349, 350, 339, 340

[56] References Cited

U.S. PATENT DOCUMENTS

| 1,886,470 | 11/1932 | Daddio | 152/366 |
|---|---|---|---|
| 2,913,034 | 11/1959 | Wall | 152/366 |
| 2,998,044 | 8/1961 | Sloneker | 152/349 |
| 3,008,770 | 11/1961 | Mueller | 152/366 |
| 3,286,757 | 11/1966 | Thomas | 152/330 R |
| 3,335,778 | 8/1967 | Blagden et al. | 152/366 |
| 3,507,316 | 4/1970 | Jaulmes | 152/366 |

FOREIGN PATENT DOCUMENTS

| 1,002,210 | 2/1957 | Fed. Rep. of Germany | 152/366 |
|---|---|---|---|
| 846,016 | 8/1960 | United Kingdom | 152/366 |

*Primary Examiner*—Drayton E. Hoffman
*Assistant Examiner*—Carl A. Rowold
*Attorney, Agent, or Firm*—Frederick K. Lacher; Frank Pincelli

[57] ABSTRACT

An elastic, fluid impervious annular shield having transversely extending folds for sealing the openings in a U-shaped well formed in a wheel rim from which spokes extend in a radial direction toward a hub used in mounting the wheel rim on an axle of a sports-type vehicle, such as a motorcycle or sports car.

2 Claims, 1 Drawing Figure

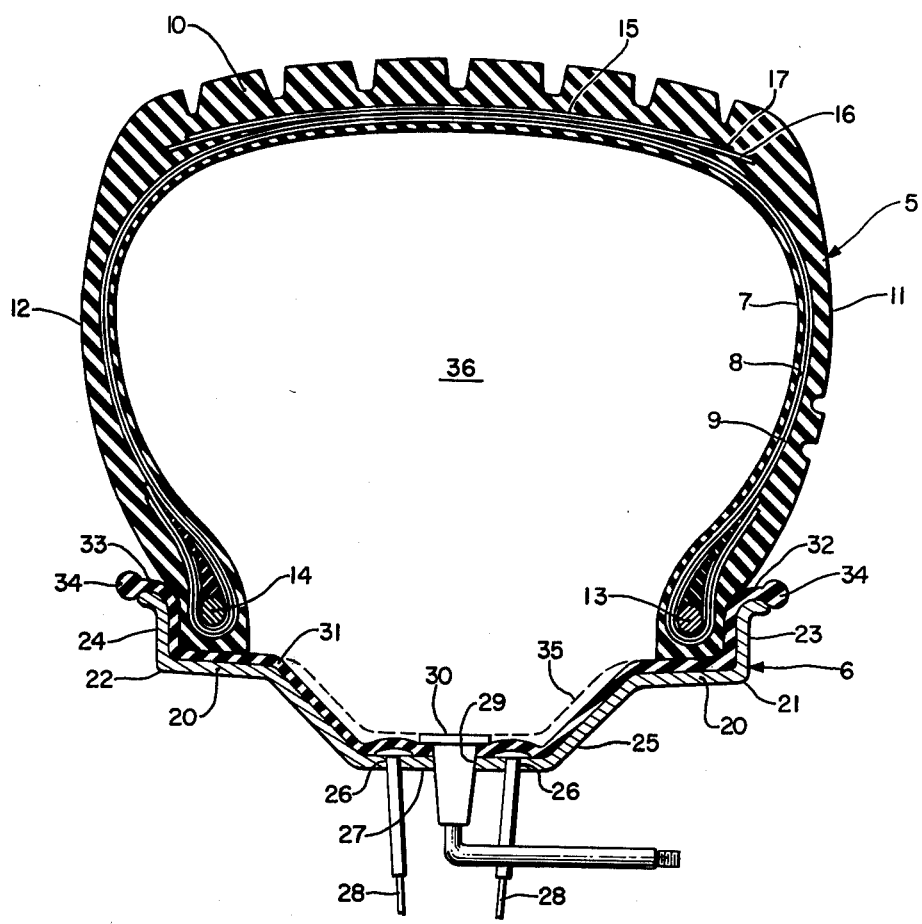

SHIELD FOR SEALING A TUBELESS TIRE ON A SPOKED WHEEL RIM

BACKGROUND OF THE INVENTION

U.S. Pat. Nos. 1,642,897 and 2,087,228 show and describe conventional tire flaps which are used in conjunction with inflatable innertubes for protecting the tube against chafing by the wheel rim on which the tire and inflatable tube are mounted. Such flaps are only used as a cushion for protecting the innertube and are, therefore, not required to be impervious to fluids since they are not relied on to maintain inflation of the tire. Very narrow and loosely fitting flaps are employed in the wells of spoked wheel rims of bicycles and motorcycles to cushion and protect the innertubes of the tube-type tires against chafing or piercing by the spokes which are secured in openings formed in the wells of the wheel rims. Such loosely fitting flaps do not adequately seal the spoke openings in the wheel rim under low inflation pressure and are, therefore, unsuitable. This may be one of the reasons why conventional tubeless pneumatic tires have not been used on motorcycles in the past. In any case, the leakage of air through the openings in which the spokes are fastened is a big problem.

Special wheel rims have recently been developed for motorcycles to accommodate conventional tubeless tires. These special rims are designed to resemble conventional spoked wheel rims normally used on motorcycles and have rigid, radially oriented spoke-like arms which connect the outer wheel rim, on which the tire is mounted to the hub that is used in mounting the wheel rim to the axle of the motorcycle. The support arms are integrally cast with the hub and wheel rim to eliminate any openings through which air can leak and cause deflation of the tire. However, motorcyclists with conventional spoked-wheel rims are still unable to use conventional tubeless tires. The invention is directed to the solution of this problem by the provision of a device which allows the utilization of tubeless tires with conventional spoked wheel rims of a motorcycle.

Briefly stated, the invention is in a shield for sealing the cavity of a tubeless tire from the ambient atmosphere when the tire is mounted and inflated on a conventional, spoked wheel rim. The shield comprises an elastic, fluid impervious annulus which is designed to matingly conform to the well and base of a conventional spoked wheel rim and sealingly engage the beads of the tire even under low inflation pressures, thereby forming with the fluid impervious innerliner of the tire, an airtight chamber in which the proper air pressure can be maintained within the tire.

ENVIRONMENT OF THE INVENTION

The following description of the invention will be better understood by having reference to the annexed drawing which is a cross-section of a tubeless tire 5 mounted on a conventional drop-center spoked wheel rim 6 normally used on motorcycles.

The tubeless tire 5 comprises the essential components of a fluid impervious innerliner 7, a plurality of carcass plies 8,9 covering the innerliner 7, and a tread 10 and pair of sidewalls 11,12 surrounding the carcass plies 8,9 and terminating at a pair of inextensible annular beads 13,14. A belt structure 15, comprising a plurality of belt plies 16,17, is interposed between the tread 10 and a radially outermost carcass ply 9 in cases where the tubeless tire 5 is of the bias-belted or radial type. The carcass plies 8,9 and the belt structure 15, if one is used, are reinforced with any suitable cords composed of material of the group of rayon, nylon, polyester, glass, aramid and steel.

The drop-center rim 6 essentially comprises a generally cylindrical base 20 having opposing marginal edges 21,22. A pair of upstanding annular rim flanges 23,24 are disposed along the marginal edges 21,22 of the base 20. A generally U-shaped well 25 is formed in the base 20 intermediate the opposite marginal edges 21,22 thereof. The well 25 extends radially inwardly toward the center axis of the wheel rim 6. A number of arcuately spaced openings 26 are provided in the bottom 27 of the well 25 to receive radially oriented spokes 28 which extend between the outer wheel rim 6 and a hub (not shown) used for mounting the wheel rim 6 on the axle of a motorcycle or sports car. The wheel well 25 is also supplied with an opening 29 for receiving a conventional valve stem 30 used in the inflation of the tubeless tire 5.

THE INVENTION

A shield 31 is provided for covering the wheel rim 6 between the beads 13,14 of the tire 5. The shield 31 is composed of any suitable elastic, fluid impervious material, e.g. natural or synthetic rubber. The shield 31 is designed to matingly engage and conform to the configurations of the wheel rim 6, when the tire 10 is mounted and inflated on the wheel rim 6, as shown in the drawing. The shield 31 can be molded or cast in such a configuration, or formed in a generally cylindrical shape having a diameter which, for convenience of mounting the shield 31 on the wheel rim 6, should be at least equal to the overall diameter of the cylindrical base 20. The shield 31 has opposing marginal edges 32,33 which extend laterally beyond the rim flanges 23,24 of the wheel rim 6. Thus, portions of the shield 31 will be compressed between the tire beads 13,14 and the adjacent rim base 20, so that the shield 31 is in sealing engagement with the tire beads 13,14 even under low inflation pressure of the tire 5. This is not the case with the flap shown in U.S. Pat. No. 2,087,228, as no attempt is made to seal the flap against the beads. In this respect, cements were unsuccessfully tried as a means for securing a narrow shield in sealing relation over the spoke openings 26 in the wheel rim 6. In essence, the positioning of the shield 31 between the rim base 20 and tire beads 13,14 acts as a mechanical seal which can be readily broken by removal of the tire 5 from the wheel rim 6 to permit easy removal and replacement of the shield 31.

A bulbous portion 34 is integrally formed with the shield 31 along each of the marginal edges 32,33 and acts to maintain the shield 31 firmly in position on the wheel rim 6 and keep the shield 31 from being drawn into the wheel well 25 during the mounting and inflation of the tubeless tire 5. The bulbous portions 34 also act as visual aids in determining whether the shield is properly maintained in position on the wheel rim 6.

A plurality of transversely oriented ribs 35, shown in dotted line, are circumferentially spaced around the shield 31, intermediate the opposing marginal edges 32,33 when the shield 31 is formed in a cylindrical shape. The ribs 35 form accordion-type folds or pleats around the shield 31 to allow controlled movement of the shield 31 into the well 25 and eliminate any transverse wrinkles in the shield 31 as it moves or contracts circumferentially into the well 25, since such wrinkles become the focal points of a build-up of stress which causes premature failure of the shield 31 from fatigue or bending.

The air valve 30 is conventionally secured to the shield 31. It can be appreciated from a study of the drawing that the shield 31 coacts with the fluid impervious innerliner 7 to seal the cavity 36 of the tire 5 from the ambient atmosphere and prevent leakage of fluid, e.g. air, through the openings 26 in which the spokes 28 are contained. The shield 31 is preferably free of any reinforcement cords, but can be reinforced with any suitable cords, as previously defined, which are disposed at appropriate angles that allow the shield 31 to expand and contract freely into and out of the well 25 of the wheel rim 6. A valveless shield 31 can be utilized in cases where the tubeless tire 5 is provided with a valve in one of the sidewalls 11,12 of the tire 5, or the air valve 30 can be located in other portions of the shield 31 than as shown in the drawing.

Thus, there has been provided an elastic shield which permits the use of tubeless tires on conventional spoked wheel rims. The elastic shield is designed to matingly engage and cover the wheel rim between the beads of the tire mounted on the rim, thereby sealing the cavity of the tire from the ambient atmosphere, whereby air, under pressure, is maintained within the tire.

What is claimed is:

1. A shield for sealing openings in a U-shaped well formed in the cylindrical base of a conventional, spoked wheel rim on which a conventional tubeless tire is mounted, comprising:
   (a) a generally cylindrical fluid impervious, elastic annulus dimensioned to at least cover the base between flanges of the wheel rim; and
   (b) transversely extending folds arcuately spaced centrally of the annulus at a position to cover the U-shaped well for controlling movement of the central portion of the annulus into the well of the wheel rim.

2. In combination:
   (a) a conventional, spoked wheel rim mountable on a motorcycle, comprising:
      (I) an annular base including a generally U-shaped well which extends radially inwardly of the base relative to the center axis of the base, the well including arcuately spaced openings for receiving spokes which extend radially inwardly from the base, the base having opposing marginal edges;
      (II) an annular flange disposed along each of the opposing marginal edges of the base, the flanges extending radially outwardly from the base;
   (b) a conventional, tubeless pneumatic tire mounted on the wheel rim, the tire having a fluid impervious innerliner and annular beads which are seated against the base and rim flanges; and
   (c) a fluid impervious, elastic shield comprising:
      (I) an annulus covering the wheel rim between the beads of the tire and being in sealing engagement with the beads even when the tire is under low inflation pressures, the shield coacting with the fluid impervious innerliner for forming a fluid chamber which is sealed from the ambient atmosphere and prevents the leakage of fluid from the chamber through the spoke containing openings of the well;
      (II) transversely extending folds arcuately spaced around the central portion thereof intermediate said beads and opposing marginal edges thereof for controlling movement of the shield into the well.

* * * * *